United States Patent
Bregman et al.

(10) Patent No.: US 11,797,504 B2
(45) Date of Patent: Oct. 24, 2023

(54) CONVERTING COMPUTING INFRASTRUCTURE DIAGRAMS TO SEARCHABLE DIAGRAMS

(71) Applicant: Red Hat, Inc., Raleigh, NC (US)

(72) Inventors: Arie Bregman, Gan Yavne (IL); Avraham Talmor, Rishon Letzion (IL); Ilan Gersht, Bat Yam (IL)

(73) Assignee: Red Hat, Inc., Raleigh, NC (US)

(*) Notice: Subject to any disclaimer, the term of this patent is extended or adjusted under 35 U.S.C. 154(b) by 43 days.

(21) Appl. No.: 17/519,566

(22) Filed: Nov. 4, 2021

(65) Prior Publication Data

US 2023/0137122 A1    May 4, 2023

(51) Int. Cl.
*G06F 16/22* (2019.01)
*G06F 16/387* (2019.01)
*G06V 30/422* (2022.01)
*G06F 18/21* (2023.01)

(52) U.S. Cl.
CPC ............ *G06F 16/22* (2019.01); *G06F 16/387* (2019.01); *G06F 18/21* (2023.01); *G06V 30/422* (2022.01)

(58) Field of Classification Search
CPC ................................ G06F 16/22; G06F 16/387
See application file for complete search history.

(56) References Cited

U.S. PATENT DOCUMENTS

| | | | |
|---|---|---|---|
| 8,447,752 B2 | 5/2013 | Wang et al. | |
| 8,532,384 B2 | 9/2013 | Howie | |
| 8,799,257 B1 | 8/2014 | Hubinette | |
| 10,210,181 B2 | 2/2019 | Nachman | |
| 2016/0127466 A1* | 5/2016 | Albrecht | H04L 67/1097 709/219 |

FOREIGN PATENT DOCUMENTS

EP     2092444 A2    8/2009

OTHER PUBLICATIONS

Carson, C. et al. "Storage and Retrieval of Feature Data for a Very Large Online Image Collection," Computer Science Division, University of California at Berkeley, 1996, IEEE, pp. 19-17.
Martinez, A.M. et al. "A New Approach to Object-Related Image Retrieval," Journal of Visual Languages and Computing, Jan. 18, 2000, pp. 345-363, vol. 11.

* cited by examiner

*Primary Examiner* — Baoquoc N To
(74) *Attorney, Agent, or Firm* — Lowenstein Sandler LLP (57) ABSTRACT

A computing infrastructure diagram is identified. A plurality of computing infrastructure components in the computing infrastructure diagram is identified. A respective component definition is associated with each computing infrastructure components of the plurality of computing infrastructure components. The computing infrastructure diagram into a searchable diagram associated with metadata comprising the component definitions of the plurality of computing infrastructure components is converted.

20 Claims, 7 Drawing Sheets

| Unique ID | Symbol | Label |
|---|---|---|
| UID 1 |  | Label 1 |
| UID 2 |  | Label 2 |
| UID 3 |  | Label 3 |
| UID 4 |  | Label 4 |
| UID 5 |  | Label 5 |
| UID 6 |  | Label 6 |
| UID 7 |  | Label 7 |
| UID 8 |  | Label 8 |
| UID 9 |  | Label 9 |
| UID 10 |  | Label 10 |
| ... | ... | ... |
| UID N |  | Label N |

CONVERTING COMPUTING INFRASTRUCTURE DIAGRAMS TO SEARCHABLE DIAGRAMS

TECHNICAL FIELD

The present disclosure is generally related to computer systems, and more particularly, for converting computing infrastructure diagrams to searchable diagrams.

BACKGROUND

Computing infrastructure diagrams are visual representation of computing infrastructure architecture. In particular, the computing infrastructure diagram illustrates various components and their connections. Typically, computing infrastructure diagram are created to provide a detailed understanding of the infrastructure in its entirety.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for converting computing infrastructure diagrams to searchable diagrams. Examples of the present disclosure refer a computing infrastructure architecture, such as, a cloud network for simplicity. However, the disclosure may be applicable to other computing infrastructure architectures.

Computing infrastructure architectures, such as, cloud computing architectures are becoming increasingly important to deliver computing resources that include servers, storage, databases, networking software, and other services via the internet. These computing infrastructure architectures are widely used by companies of all sizes for leveraging the power of cloud resources to solve all kinds of business problems.

Typically, administrators of the computing infrastructure architectures generate and export computing infrastructure diagrams to visually depict the computing infrastructure architecture. These computing infrastructure diagrams provide clear indication of the various computing components of the computing infrastructure architecture and the relationship between them. However, the exported computing infrastructure diagrams are typically images or non-indexed formatted files which are non-interactive, resulting in users and administrators unable to query the computing infrastructure diagrams for a particular computing components and/or relationship between computing components.

Aspects of the present disclosure address the above-noted and other deficiencies by converting the exported computing infrastructure diagram to a searchable diagram. In particular, breaking down the computing infrastructure diagram into individual computing components by identifying the various computing components of the exported computing infrastructure diagram associated with exported computing infrastructure architecture. Each of the identified computing components of the exported computing infrastructure diagram are associated with a component definition that includes a label (e.g., name of the component), unique identifier, and a symbol. Accordingly, based on the association of the identified computing components of the exported computing infrastructure diagram with a specific component definition, the exported computing infrastructure diagram may be converted to a searchable diagram.

Advantages of the present disclosure include, but are not limited to, facilitating querying of computing infrastructure diagrams by converting the computing infrastructure diagrams to searchable diagrams, thereby, allowing for increased interaction and comprehension of the computing infrastructure architecture.

Figure 1A:
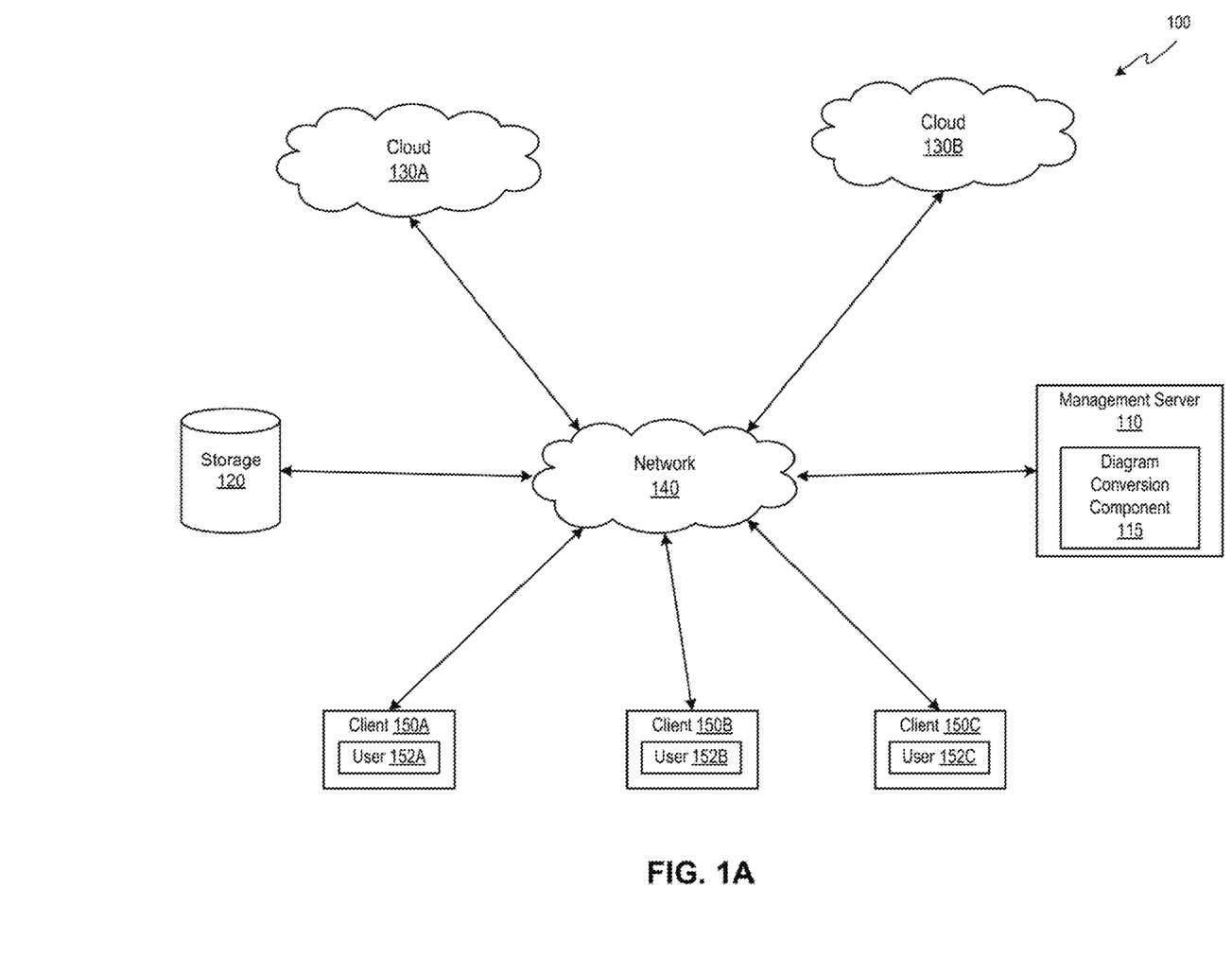
FIG. 1A depicts an exemplary computing infrastructure architecture, in accordance with one or more aspects of the present disclosure.

FIG. 1A is a block diagram of a computing infrastructure architecture 100 (e.g., a cloud architecture 100) in which embodiments of the invention may operate. The cloud architecture 100 may include a cloud(s) 130A, 130B managed by various cloud provider systems. There may be any number of cloud(s) and cloud provider systems. For brevity and simplicity, cloud(s) 130A, 130B are used as an example throughout this document. In an embodiment, the cloud architecture includes clouds, and the clouds may be provided by a single cloud provider. Cloud(s) 130A, 130B may deploy services. There may be any number of services being deployed in cloud(s) 130A, 130B. For brevity and simplicity, services in cloud(s) 130A, 130B is used as an example in architecture 100. Services, as discussed herein, may refer to a computing resource, such as virtual machine instances, disk storage, memory, vCPUs, or networks, for example. Each service is hosted or enabled on a physical machine configured as part of the cloud(s) 130A, 130B. Such physical machines are often located in a data center.

The cloud provider system and cloud(s) 130A, 130B may be provided as an infrastructure as a service (IaaS) layer. The cloud provider system and cloud(s) 130A, 130B may be provided by, for example, a third party cloud provider or an organization including consumers of cloud(s) 130A, 130B. A cloud provider may provide more than one type of cloud provider system and more than one type of cloud(s) 130A, 130B. The cloud provider may be an entity. An entity, as referred to here, may represent any person, a business organization such as a corporation, an educational institution such as a college or university, etc. Users (e.g., clients) may interact with applications executing on cloud-based virtual machines using client computer systems, such as clients 150A, 150B, 150C. Users 152A, 152B, 152C may have one or more accounts associated with a cloud provider system.

Clients 150A, 150B, 150C are connected to hosts and cloud provider system via a network 140, which may be may be a private network (e.g., a local area network (LAN), a wide area network (WAN), intranet, or other similar private networks) or a public network (e.g., the Internet). Each client 150A, 150B, 150C having a corresponding storage may be a mobile device, a PDA, a laptop, a desktop computer, or any other computing device. Additionally, each client 150A, 150B, 150C may have access to storage 120. The storage 120 may reside locally or remotely, and may represent a single data structure or multiple data structures (databases, repositories, files, etc.) residing on one or more mass storage devices, such as magnetic or optical storage based disks, solid-state drives (SSDs) or hard drives. Each host may be a server computer system, a desktop computer or any other computing device. The cloud provider system may include one or more machines such as server computers, desktop computers, etc.

In one embodiment, the cloud provider system is coupled to a management server 110 via the network 140. The management server 110 may be maintained by a cloud consumer of cloud(s) 130A, 130B such as an enterprise (e.g., business, company, organization, etc.). In another embodiment, the management server 110 may be maintained by a third party cloud provider. In yet another embodiment, the management server 110 may be part of the cloud provider system.

Figure 1B:
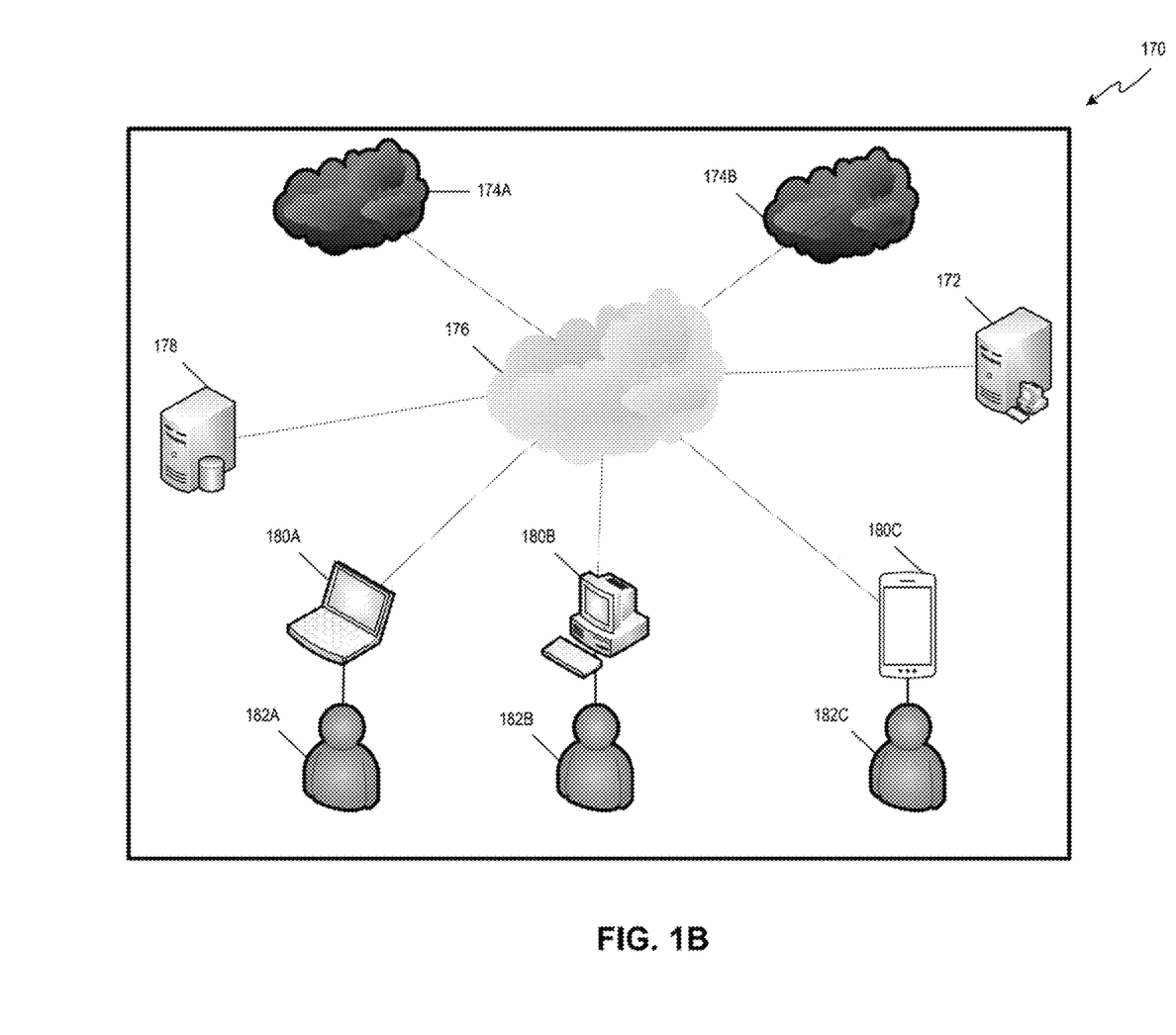
FIG. 1B depicts an computing infrastructure diagram of the exemplary computing infrastructure architecture, in accordance with one or more aspects of the present disclosure.

The management server 110 may manage the deployment of services in the cloud(s) 130A, 130B. In some embodiments, the management server 110 may receive a request, for example, from a system administrator via a client 150A, 150B, 150C, describing a set of services to be deployed in the cloud(s) 130A, 130B. Referring to FIG. 1B, in some embodiments, the management server 110 may generate and store a computing infrastructure diagram 170 of the cloud architecture 100 in storage 120 of cloud architecture 100. The generated computing infrastructure diagram 170 is provided in a non-searchable format, thus the generated computing infrastructure diagram 170 may not be searched (e.g., queried) for any components of the cloud architecture 100. In some embodiments, the generated computing infrastructure diagram 170 is provided in a non-indexed format, thus the generated computing infrastructure diagram 170 may not include an indexed list of components of the cloud architecture 100 crossed reference with their respective location in the generated computing infrastructure diagram 170. Depending on the embodiment, the computing infrastructure diagram 170 of the cloud architecture 100 may be generated by a third party and stored in storage 120 of cloud architecture 100 for future reference.

The computing infrastructure diagram 170 (FIG. 1B) is a visual representation of the cloud architecture 100 (FIG. 1A) in which each component of the cloud architecture 100 corresponds to a component of the computing infrastructure diagram 170. For example, component 172 of the computing infrastructure diagram 170 is a visual representation of the management server 110 of the cloud architecture 100, component 174A and B of the computing infrastructure diagram 170 is a visual representation of cloud(s) 130A, 130B of the cloud architecture 100, component 176 of the computing infrastructure diagram 170 is a visual representation of network 140 of the cloud architecture 100, component 178 of the computing infrastructure diagram 170 is a visual representation of storage 120 of the cloud architecture 100, component 180A-C of the computing infrastructure diagram 170 is a visual representation of client 150A-C of the cloud architecture 100, and component 182A-C of the computing infrastructure diagram 170 is a visual representation of user 152A-C of the cloud architecture 100.

The management server 110 may further include a diagram conversion component 115 to convert the computing infrastructure diagram 170 stored in storage 120 of the cloud architecture 100 to a searchable diagram. In some embodiments, diagram conversion component 115 may be executed by a computing device not in the cloud architecture 100. In some embodiments, diagram conversion component 115 may be executed by a computing device not in communication with the cloud architecture 100. The diagram conversion component 115 may identify a computing infrastructure diagram 170 of the cloud architecture 100 stored in storage 120 of the cloud architecture 100. The diagram conversion component 115 may break down (e.g., crop and extract) the computing infrastructure diagram 170 into individual components (e.g., 172, 174A/B, 176, 178, 180A-C, 182A-C). In some embodiments, the diagram conversion component 115 may crop the individual components from the computing infrastructure diagram 170 for comparison. To crop the individual components from the computing infrastructure diagram 170, image processing is used to identify the outer bounds (e.g., a pre-processing image operation to identify the image to crop) of the individual components and based on the outer bounds, image processing may extract from the computing infrastructure diagram 170 the individual components (e.g., an image processing operation used to extract the identified image).

Once the diagram conversion component 115 breaks down the computing infrastructure diagram 170 into individual components, the diagram conversion component 115 may perform a query on computing infrastructure symbol table 200 (FIG. 2) stored in storage 120 of the cloud architecture 100 to identify component definitions based on a comparison between the respective individual component and a symbol of the computing infrastructure symbol table 200. In particular, for example, the respective individual component is iteratively compared with each symbol of the computing infrastructure symbol table 200 until a match is found. Upon matching a symbol of the computing infrastructure symbol table 200, the information corresponding to the symbol of the computing infrastructure symbol tale 200 is associated with the respective individual symbol. The computing infrastructure symbol table 200 (FIG. 2) is a look up table of known computing infrastructure symbols used to generate computing infrastructure diagrams. Each entry (240A-Z) of the computing infrastructure symbol table 200 is a component definitions which include a unique ID 210, a symbol 220 (i.e., known symbol used in computing infrastructure diagrams), and a corresponding label 230 for symbol 220. Depending on the embodiment, the unique ID 210 may be a unique identification value assigned by the management server 110 (e.g., a component or user of the cloud architecture).

Figure 2:
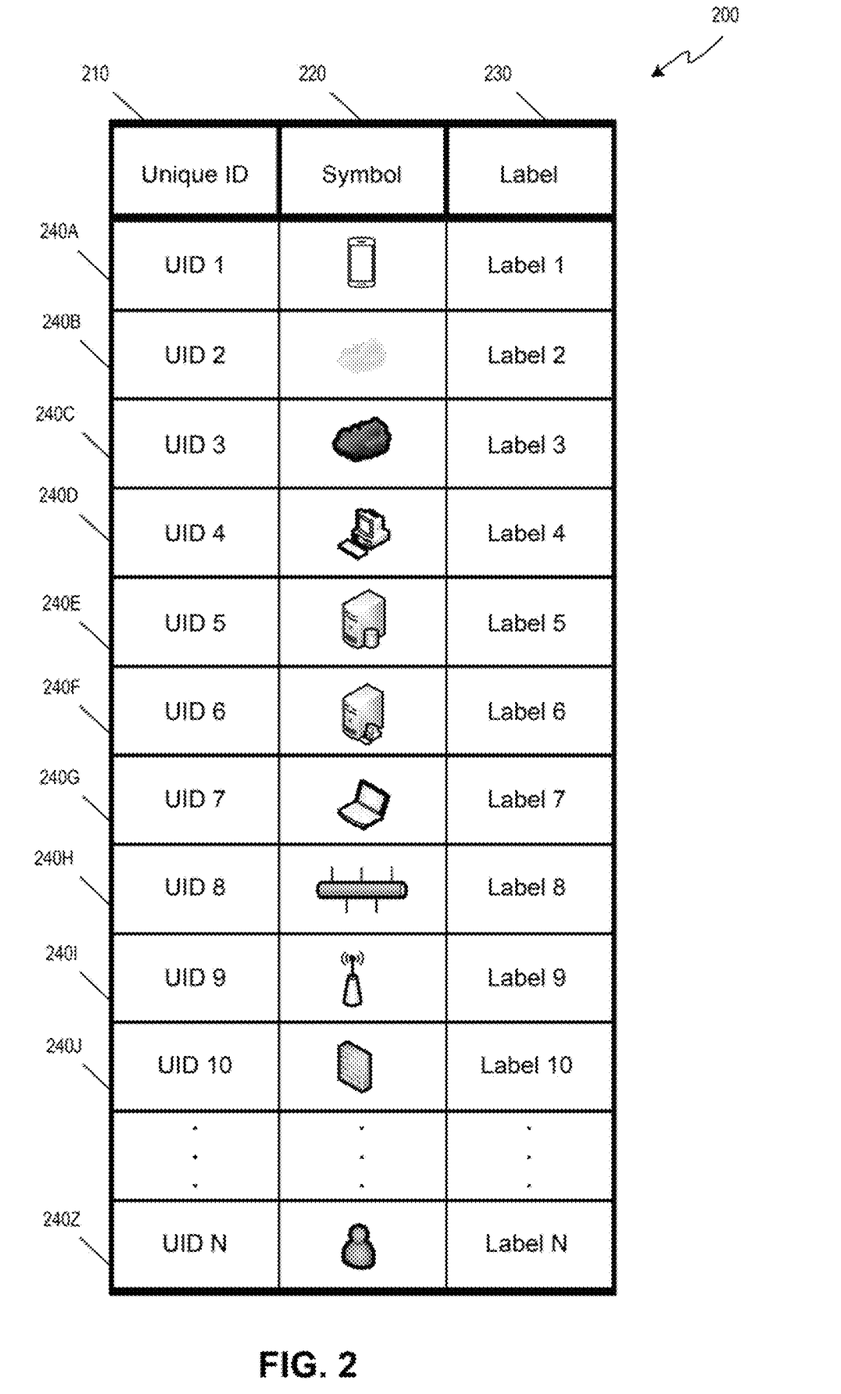
FIG. 2 is a look-up table to determine a component definition for each symbol of computing infrastructure diagram, in accordance with one or more aspects of the present disclosure.

Depending on the embodiment, once the diagram conversion component 115 identifies the unique ID 210 and the label 230 associated with the component of the computing infrastructure diagram 170 based on the comparison between the respective component and the symbol 220, the diagram conversion component 115 may mark the component with the unique ID 210 and/or the label 230. In some embodiments, the diagram conversion component 115 may list (e.g., index) the components of the computing infrastructure diagram 170 based on the unique ID 210 and/or the label 230. Listing (e.g., indexing) the components of the computing infrastructure diagram 170 according to the unique ID 210 and/or the label 230 includes storing each component of the computing infrastructure diagram 170 as an entry in a list (e.g., data structure) with the unique ID 210 and/or the label 230 cross-referenced with a location of the respective component of the computing infrastructure diagram 170. Depending on the embodiment, listing the components of the computing infrastructure diagram 170 may include using a sequential ordering of the components of the computing infrastructure diagram 170 in the list.

Once the components of the computing infrastructure diagram 170 are marked and/or indexed, the diagram conversion component 115 may further convert the computing infrastructure diagram 170 into a searchable diagram. Depending on the embodiment, to convert the computing infrastructure diagram 170 into a searchable diagram, the diagram conversion component 115 may generate the searchable diagram by utilizing the index list which includes the component definitions (e.g., the unique ID 210 and/or the label 230 of the components of the computing infrastructure diagram 170) and the location of the components of the computing infrastructure diagram 170 to create a new computing infrastructure diagram (e.g., the searchable diagram) by placing the symbol 220 or the original component of the computing infrastructure diagram 170 to a location on the new computing infrastructure diagram corresponding to the location of the component of the computing infrastructure diagram 170 with metadata comprising the component definitions.

The diagram conversion component 115 may receive a search request for a component of the searchable diagram. The search request may be a request to search a component of the searchable diagram (e.g., components and their connections) and/or relationships between components (e.g., clouds connected to a network). For example, the diagram conversion component 115 may receive a text input (e.g., network or clouds connected to network) to highlight the respective component in the searchable diagram. Depending on the embodiment, the diagram conversion component 115 may search, in response to the search request, metadata of the searchable diagram (e.g., component definitions) for the components or connections between components associated with the search request. In some embodiments, the diagram conversion component 115 may search, in response to the search request, components or connections between components marked with text (e.g., unique ID and/or label) associated with the search request.

Once the metadata or text is located, the diagram conversion component 115 may highlight the component of the searchable diagram and/or relationships between components of the searchable diagram. In some embodiments, in response to the search request, the diagram conversion component 115 may query the index list to determine the symbol 220 corresponding to the component of the searchable diagram associated with the search request. Once the symbol 220 is identified, the diagram conversion component 115 may highlight the component of the searchable diagram based on the cross-referenced location. The diagram conversion component 115 is further described below.

Figure 3:
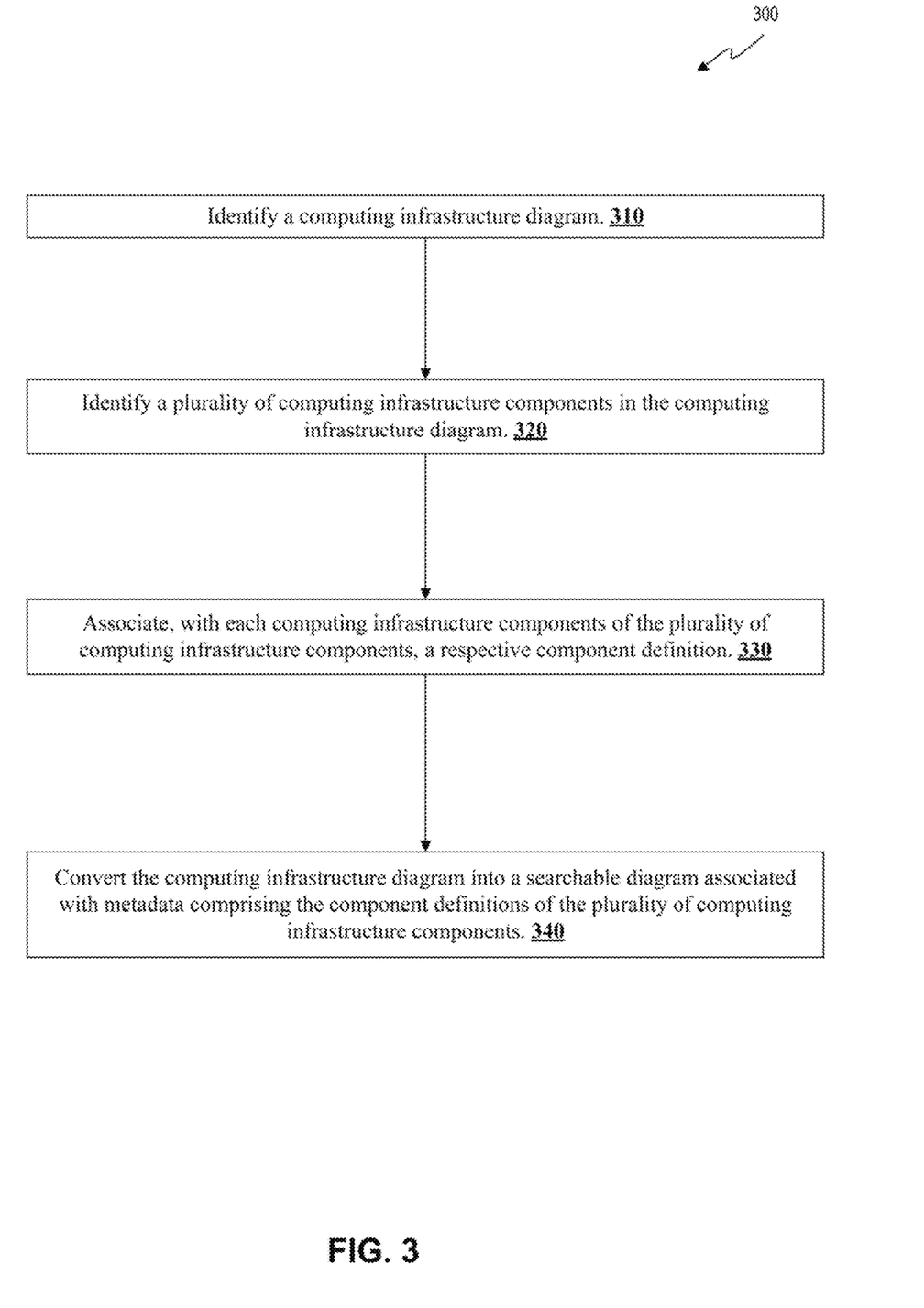
FIG. 3 depicts a flow diagram of an example method for converting computing infrastructure diagrams to searchable diagrams, in accordance with one or more aspects of the present disclosure.

FIG. 3 depicts a flow diagram of an illustrative example of a method 300 for converting a computing infrastructure diagram to searchable diagram, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 300 may be performed by processing devices of a server device or a client device and may begin at block 310.

At block 310, the processing device identifies a computing infrastructure diagram. As described previously, the processing device may identify the computing infrastructure diagram stored in a storage of the computing infrastructure architecture corresponding to the computing infrastructure diagram.

At block 320, the processing device identifies a plurality of computing infrastructure components in the computing infrastructure diagram. As described previously, the processing device may identify the plurality of computing infrastructure components in the computing infrastructure diagram by breaking down the computing infrastructure diagram into individual computing infrastructure components. Depending on the embodiment, the processing device may extract, using image processing, the plurality of computing infrastructure components from the computing infrastructure diagram.

At block 330, the processing device associates, with each computing infrastructure components of the plurality of computing infrastructure components, a respective component definition. To associate, with each computing infrastructure components of the plurality of computing infrastructure components, the respective component definition, the processing device determines whether the respective computing infrastructure component of the plurality of computing infrastructure components matches a computing infrastructure symbol of a plurality of computing infrastructure symbols. As described previously, the plurality of computing infrastructure symbols may be stored in a computing infrastructure symbol table which is a look up table of known computing infrastructure symbols used to generate computing infrastructure diagrams. Each entry of the computing infrastructure symbol table is a computing infrastructure symbol of the plurality of computing infrastructure symbols associated with a component definition which includes a unique ID, a symbol, and a corresponding label for symbol.

In some embodiments, the processing device stores, in an index list, each computing infrastructure component, the respective component definition, and a cross reference to a location on the computing infrastructure diagram. To store, in the index list, each computing infrastructure component, the respective component definition, as described previously, the processing device marks the computing infrastructure component with the associated component definition (e.g., unique ID 210 and/or the label 230). In some embodiments, the processing device indexes the computing infrastructure component based on the component definition (e.g., unique ID 210 and/or the label 230) as an entry in the index list cross-referenced with a location of the respective computing infrastructure component. Depending on the embodiment, the index list may be indexed consecutively.

At block 340, the processing device converts the computing infrastructure diagram into a searchable diagram associated with metadata comprising the component definitions of the plurality of computing infrastructure components. To convert the computing infrastructure diagram into the searchable diagram associated with metadata comprising the component definitions, the processing device generates the searchable diagram based on a location of each computing infrastructure component on the computing infrastructure diagram and the component definition associated with the computing infrastructure component.

In some embodiments, to generate the searchable diagram based on the location of each computing infrastructure component of the plurality of computing infrastructure components on the computing infrastructure diagram and the component definition associated with the computing infrastructure component, the processing device positions each computing infrastructure component of the plurality of computing infrastructure components at a location in the searchable diagram relative to the location of the respective computing infrastructure component of the plurality of computing infrastructure components. In some embodiments, to generate the searchable diagram, the processing device may utilize the index list which includes the component definitions of each computing infrastructure component of the plurality of computing infrastructure components (e.g., the unique ID and/or the label) and the location of the computing infrastructure component of the plurality of computing infrastructure components to create the searchable diagram by placing the symbol associated with the computing infrastructure component or the original component of computing infrastructure component to a location on the searchable diagram corresponding to the location of the computing infrastructure component with metadata comprising the component definitions.

In some embodiments, responsive to receiving a request to search the searchable diagram for a computing infrastructure component of interest, the processing device highlights the computing infrastructure component of interest on the searchable diagram. Depending on the embodiment, the search request may be a request to search a component of the searchable diagram (e.g., components and their connections) and/or relationships between components (e.g., clouds connected to a network). To search the searchable diagram for the computing infrastructure component of interest, the processing device searches the metadata of the searchable diagram (e.g., component definitions) for the computing infrastructure component or connections between computing infrastructure component matching text of the search request. Once the text matches the metadata data, the processing device highlights the computing infrastructure component of interest in the searchable diagram and/or relationships between computing infrastructure component of interest in the searchable diagram.

In some embodiments, in response to the search request, the processing device queries the index list to determine a computing infrastructure component of interest to highlight in the searchable diagram based on the text of the search request matching a component definitions of the computing infrastructure component (e.g., unique ID and/or label) in the index list. Once a matching component definition is determined, the processing device highlights the cross-referenced location of the computing infrastructure component of interest in the searchable diagram.

Responsive to completing the operations described herein above with references to block 340, the method may terminate.

Figure 4:
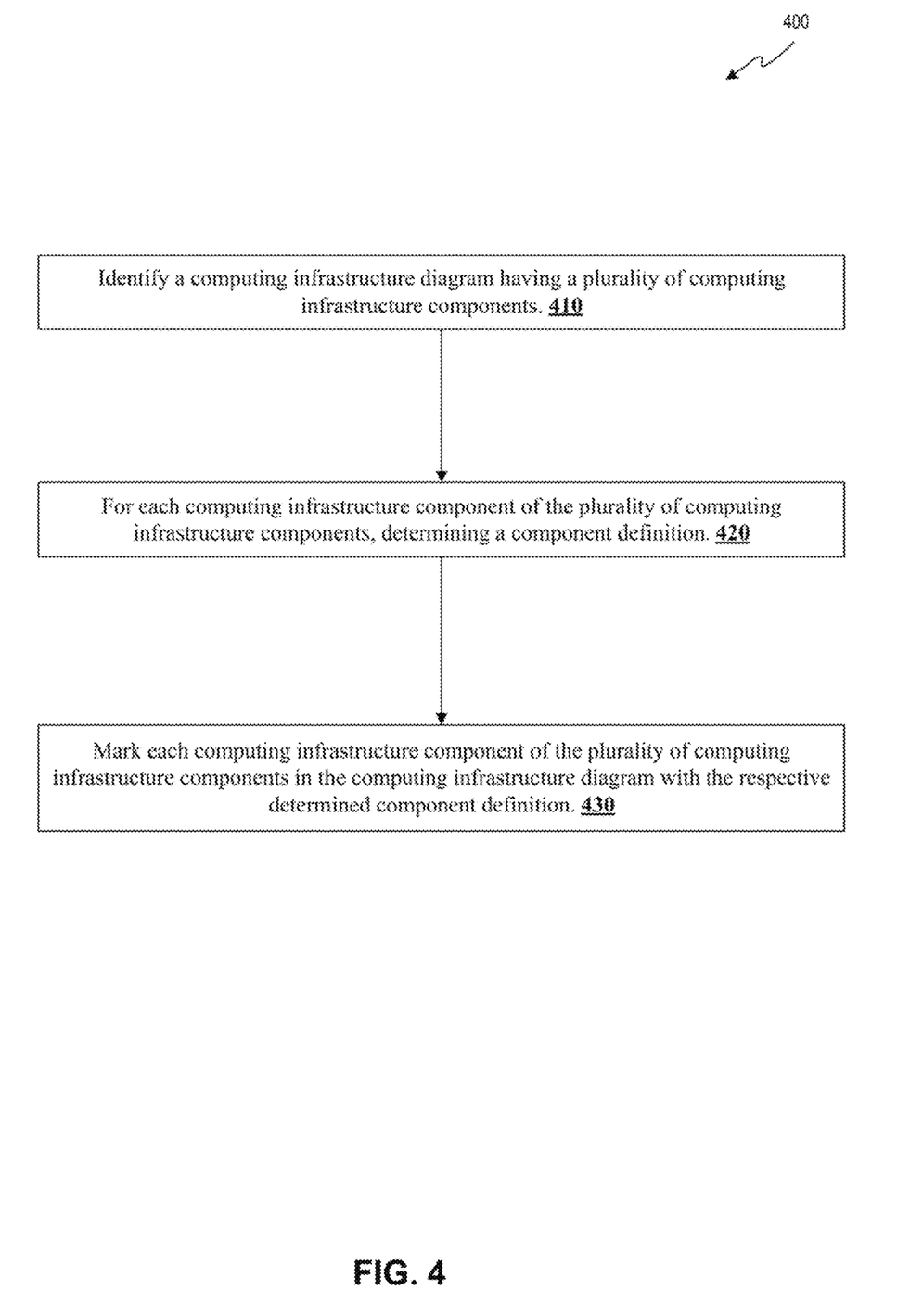
FIG. 4 depicts a flow diagram of an example method for converting computing infrastructure diagrams to searchable diagrams, in accordance with one or more aspects of the present disclosure.

FIG. 4 depicts a flow diagram of an illustrative example of a method 400 for converting a computing infrastructure diagram to searchable diagram, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 400 may be performed by processing devices of a server device or a client device and may begin at block 410.

At block 410, the processing device identifies a computing infrastructure diagram having a plurality of computing infrastructure components. As described previously, the processing device may identify the computing infrastructure diagram stored in a storage of the computing infrastructure architecture corresponding to the computing infrastructure diagram.

At block 420, for each computing infrastructure component of the plurality of computing infrastructure components, the processing device determines a component definition. To determine the component definition, the processing device determines whether the respective computing infrastructure component of the plurality of computing infrastructure components matches a computing infrastructure symbol of a plurality of known computing infrastructure symbols. Each computing infrastructure symbol of the plurality of computing infrastructure symbols corresponds to a component definition. As described previously, each known computing infrastructure symbol and their corresponding component definition may be stored in a computing infrastructure symbol table which is a look up table of known computing infrastructure symbols used to generate computing infrastructure diagrams. The component definition may include a unique ID, a symbol, and a corresponding label for symbol.

At block 430, the processing device marks each computing infrastructure component of the plurality of computing infrastructure components in the computing infrastructure diagram with the respective determined component definition. In some embodiments, the processing device stores, in an index list, each marked computing infrastructure component and a cross reference to a location on the computing infrastructure diagram. Depending on the embodiment, the index list may be indexed consecutively.

In some embodiments, responsive to receiving a request to search the computing infrastructure diagram for a computing infrastructure component of interest, the processing device highlights the computing infrastructure component of interest on the computing infrastructure diagram. Depending on the embodiment, the search request may be a request to search a computing infrastructure component of interest in the computing infrastructure diagram (e.g., components and their connections) and/or relationships between components (e.g., clouds connected to a network). To search the computing infrastructure diagram for the computing infrastructure component of interest, the processing device searches each marked computing infrastructure component (e.g., metadata comprising component definition) for the computing infrastructure components or connections between computing infrastructure components matching text of the search request. Once the text matches the metadata data, the processing device highlights the computing infrastructure component of interest in the computing infrastructure diagram and/or relationships between computing infrastructure component of interest in the computing infrastructure diagram.

In some embodiments, in response to the search request, the processing device queries the index list to determine a computing infrastructure component of interest to highlight in the computing infrastructure diagram based on the text of the search request matching a component definitions of the computing infrastructure component (e.g., unique ID and/or label) in the index list. Once a matching component definition is determined, the processing device highlights the cross-referenced location of the computing infrastructure component of interest in the computing infrastructure diagram.

Responsive to completing the operations described herein above with references to block 430, the method may terminate.

Figure 5:
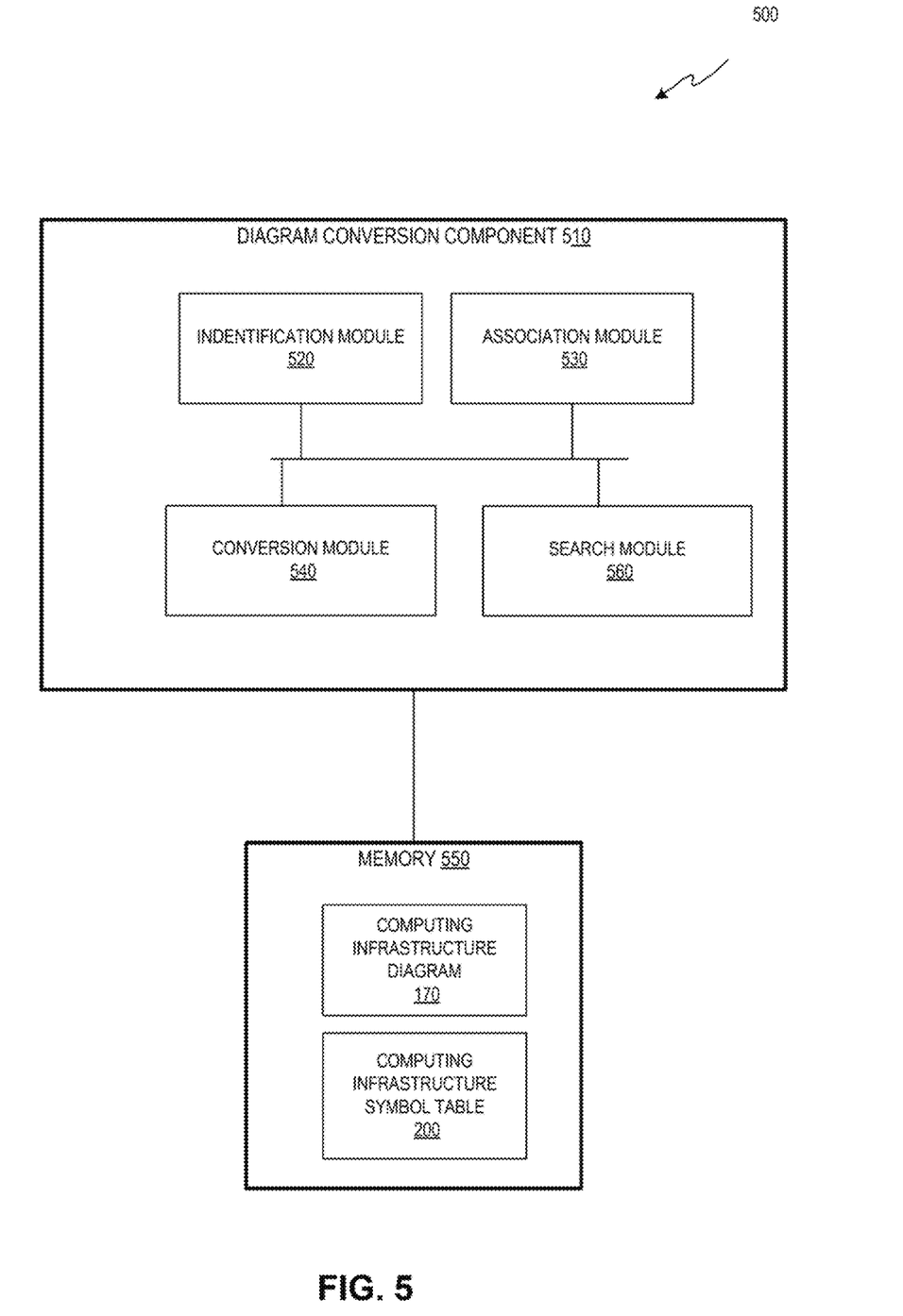
FIG. 5 depicts a block diagram of an example system in accordance with one or more aspects of the present disclosure.

FIG. 5 depicts a block diagram of a system 500 operating in accordance with one or more aspects of the present disclosure. System 500 may be the same or similar to the system 100 and may include one or more processing devices and one or more memory devices. In the example shown, system 500 may include a diagram conversion component 510 having an identification module 520, an association module 530, a conversion module 540, a search module 560, and a memory 550 storing a computing infrastructure diagram (e.g., computing infrastructure diagram 170) and a computing infrastructure symbol (e.g., computing infrastructure symbol table 200).

The identification module 520 of the diagram conversion component 510 may identify a computing infrastructure diagram of the computing infrastructure architecture (e.g., computing infrastructure diagram 170) stored in memory 550. The identification module 520 may further break down the computing infrastructure diagram into individual components. In some embodiments, the identification module 520 may crop the individual components from the computing infrastructure diagram for comparison.

The association module 530 of the diagram conversion component 510 may query a computing infrastructure symbol table (e.g., computing infrastructure symbol table 200) stored in memory 550 to identify a component definition for each of the individual components. The computing infrastructure symbol table is a look up table of known computing infrastructure symbols used to generate computing infrastructure diagrams. Each entry of the computing infrastructure symbol table includes a component definition having a unique ID, a symbol (i.e., known symbol used in computing infrastructure diagrams), and a label. The component definitions of each of the individual components are based on a comparison between the respective individual component and a symbol of the computing infrastructure symbol table. Upon determining that a symbol of the computing infrastructure symbol table matches the individual component of the computing infrastructure diagram, the association module 530, associates the component definition with the individual component of the computing infrastructure diagram.

Associating the component definition with the individual component of the computing infrastructure diagram may include, the association module 530 marking the individual component of the computing infrastructure diagram with the unique ID and/or label. In some embodiments, the association module 530 may index each individual components based on the unique ID and/or label. Indexing the individual components of the computing infrastructure diagram based on the unique ID and/or label include, the association module 530 storing the each individual component as an entry in an index list with the unique ID and/or label cross-referenced with a location of the respective individual component in the computing infrastructure diagram.

The conversion module 540 of diagram conversion component 510 may convert the computing infrastructure diagram into a searchable diagram (e.g., new computing infrastructure diagram). Depending on the embodiment, to convert the computing infrastructure diagram into the searchable diagram, the conversion module 540 generates the searchable diagram based on the individual components associated with the component definition and a location of the individual components on the computing infrastructure diagram. In some embodiments, the conversion module 540 generates the searchable diagram by utilizing the index list which includes the component definitions (e.g., the unique ID and/or label) of the individual components and a cross-reference to a location of the individual components in the computing infrastructure diagram to create the searchable diagram. The conversion module 540 places the symbol or the original individual component of the computing infrastructure diagram to a location on the searchable diagram corresponding to the location of the individual component of the computing infrastructure diagram with metadata comprising the component definitions.

After converting the computing infrastructure diagram to the searchable diagram, the search module 560 receives a search request for a component of interest in the searchable diagram. The search request may be a request to search a component, a components and their connections, and/or relationships between components. In some embodiments, the search module 560 searches the metadata of the searchable diagram (e.g., component definitions) for the components or connections between components associated with the search request. In some embodiments, the search module 560 searches components or connections between components marked with text (e.g., unique ID and/or label) associated with the search request.

Once the component or connections are located, the search module 560 highlights the component of the searchable diagram and/or relationships between components of the searchable diagram. In some embodiments, the search module 560 queries the index list for a component definition (e.g., unique ID and/or label) matching the text associated with the search request to determine the component of interest to highlight. The search module 560 highlights the individual component of interest in the searchable diagram based on the cross-referenced location associated with the component definition matching the text.

Figure 6:
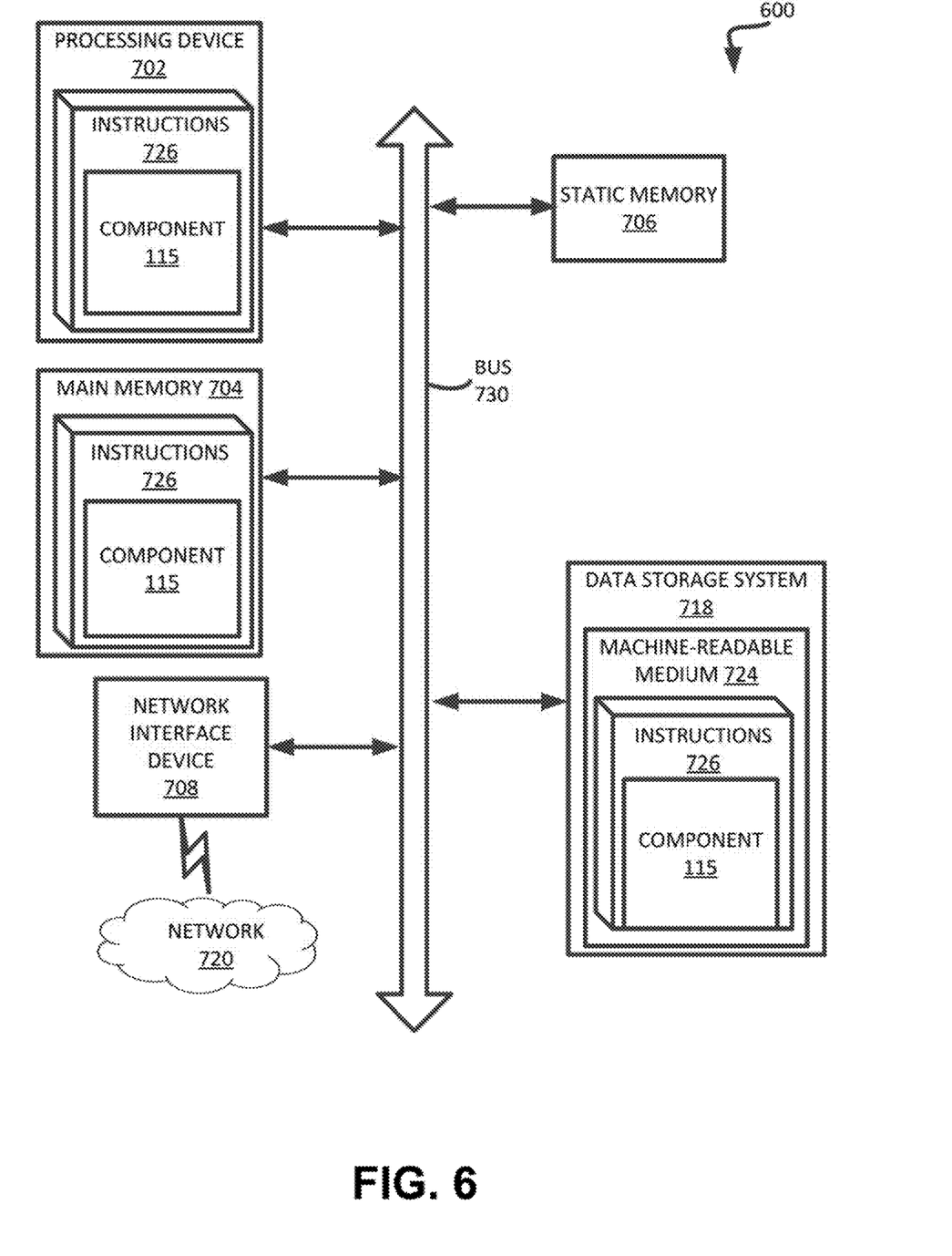
FIG. 6 depicts a block diagram of an illustrative computing device operating in accordance with the examples of the present disclosure.

FIG. 6 illustrates an example machine of a computer system 700 within which a set of instructions, for causing the machine to perform any one or more of the methodologies discussed herein, can be executed. In some embodiments, the computer system 700 can correspond to a management server (e.g., the management server 110 of FIG. 1A) that can be used to perform the operations corresponding to the diagram conversion component 115 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media.

In one embodiment, the instructions 726 include instructions to implement functionality corresponding to a diagram conversion component (e.g., the diagram conversion component 115 of FIG. 1A). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory device; and
    a processing device, operatively coupled with the memory device, to perform operations comprising:
        identifying a computing infrastructure diagram providing a visual representation of a cloud architecture;
        extracting, from the computing infrastructure diagram, a visual representation of each of a plurality of computing infrastructure components;
        associating, with each visual representation of a computing infrastructure component of the plurality of computing infrastructure components, a respective component definition; and
        converting the computing infrastructure diagram into a searchable diagram associated with metadata comprising the component definitions of the plurality of computing infrastructure components, wherein the searchable diagram is the visual representation of the cloud architecture enhanced with metadata.

2. The system of claim 1, wherein associating, with each visual representation of a computing infrastructure component of the plurality of computing infrastructure components, the respective component definition includes determining whether the respective computing infrastructure component of the plurality of computing infrastructure components matches a computing infrastructure symbol of a plurality of computing infrastructure symbols.

3. The system of claim 2, wherein each computing infrastructure symbol of the plurality of computing infrastructure symbols is associated with a component definition.

4. The system of claim 1, wherein the operations further comprise:
    storing, in an indexed data structure, each computing infrastructure component, the respective component definition, and a cross reference to a location on the computing infrastructure diagram.

5. The system of claim 1, wherein converting the computing infrastructure diagram into the searchable diagram includes generating the searchable diagram based on a first location of each computing infrastructure component on the computing infrastructure diagram and the component definition associated with the computing infrastructure component.

6. The system of claim 5, wherein generating the searchable diagram includes positioning each computing infrastructure component of the plurality of computing infrastructure components at a second location in the searchable diagram relative to the first location of the respective computing infrastructure component of the plurality of computing infrastructure components.

7. The system of claim 1, wherein the operations further comprise:
    responsive to receiving a request to search the searchable diagram for a computing infrastructure component of interest, visually differentiating the computing infrastructure component of interest on the searchable diagram.

8. The system of claim 1, wherein identifying a plurality of computing infrastructure components in the computing infrastructure diagram includes extracting, using image processing, the plurality of computing infrastructure components from the computing infrastructure diagram.

9. A method comprising:
    identifying a computing infrastructure diagram providing a visual representation of a cloud architecture;
    extracting, from the computing infrastructure diagram, a visual representation of each of a plurality of computing infrastructure components;
    associating, with each visual representation of a computing infrastructure component of the plurality of computing infrastructure components, a respective component definition; and
    converting the computing infrastructure diagram into a searchable diagram associated with metadata comprising the component definitions of the plurality of computing infrastructure components, wherein the searchable diagram is the visual representation of the cloud architecture enhanced with metadata.

10. The method of claim 9, wherein associating, with each computing infrastructure components of the plurality of computing infrastructure components, the respective component definition includes determining whether the respective computing infrastructure component of the plurality of computing infrastructure components matches a computing infrastructure symbol of a plurality of computing infrastructure symbols.

11. The method of claim 9, wherein each computing infrastructure symbol of the plurality of computing infrastructure symbols is associated with a component definition.

12. The method of claim 9, further comprising:
storing, in an indexed data structure list, each computing infrastructure component, the respective component definition, and a cross reference to a location on the computing infrastructure diagram.

13. The method of claim 12, wherein converting the computing infrastructure diagram into the searchable diagram includes generating the searchable diagram based on a first location of each computing infrastructure component on the computing infrastructure diagram and the component definition associated with the computing infrastructure component.

14. The method of claim 13, wherein generating the searchable diagram includes positioning each computing infrastructure component of the plurality of computing infrastructure components at a second location in the searchable diagram relative to the first location of the respective computing infrastructure component of the plurality of computing infrastructure components.

15. The method of claim 9, further comprising:
responsive to receiving a request to search the searchable diagram for a computing infrastructure component of interest, visually differentiating the computing infrastructure component of interest on the searchable diagram.

16. The method of claim 9, wherein identifying a plurality of computing infrastructure components in the computing infrastructure diagram includes extracting, using image processing, the plurality of computing infrastructure components from the computing infrastructure diagram.

17. A non-transitory computer-readable storage medium comprising instructions that, when executed by a processing device, cause the processing device to perform operations comprising:

identifying a computing infrastructure diagram, wherein the computing infrastructure diagram provides a visual representation of a cloud architecture including a visual representation of each computing infrastructure component of a plurality of computing infrastructure components;

for the visual representation of each computing infrastructure component of the plurality of computing infrastructure components, determining a component definition; and marking the visual representation of each computing infrastructure component of the plurality of computing infrastructure components in the computing infrastructure diagram with the respective determined component definition.

18. The non-transitory computer-readable storage medium of claim 17, wherein determining the component definition includes determining whether the respective computing infrastructure component of the plurality of computing infrastructure components matches a computing infrastructure symbol of a plurality of known computing infrastructure symbols.

19. The non-transitory computer-readable storage medium of claim 18, wherein each computing infrastructure symbol of the plurality of known computing infrastructure symbols corresponds to a component definition.

20. The non-transitory computer-readable storage medium of claim 17, further comprising:
responsive to receiving a request to search the computing infrastructure diagram for a computing infrastructure component of interest, visually differentiating the computing infrastructure component of interest on the computing infrastructure diagram.

* * * * *